US005815168A

United States Patent [19]

May

[11] Patent Number: 5,815,168

[45] Date of Patent: Sep. 29, 1998

[54] TILED MEMORY ADDRESSING WITH PROGRAMMABLE TILE DIMENSIONS

[75] Inventor: Bradley Andrew May, San Jose, Calif.

[73] Assignee: Cirrus Logic, Inc., Fremont, Calif.

[21] Appl. No.: 576,871

[22] Filed: Dec. 21, 1995

Related U.S. Application Data

[60] Provisional application No. 60/000,501 Jun. 23, 1995.

[51] Int. Cl.[6] .............................. G06F 12/06; G09G 5/36

[52] U.S. Cl. .............................. 345/516; 345/515; 711/221

[58] Field of Search .............................. 395/501–526, 395/412, 413, 416, 418, 419, 421.08, 421.11; 345/185, 187, 189, 190, 200, 501–526; 711/200, 202, 203, 206, 208, 209, 218, 221

[56] References Cited

U.S. PATENT DOCUMENTS

| | | | |
|---|---|---|---|
| 4,546,451 | 10/1985 | Bruce | 364/900 |
| 4,906,986 | 3/1990 | Takeda | 340/799 |
| 4,935,880 | 6/1990 | Kelleher et al. | 364/522 |
| 4,965,751 | 10/1990 | Thayer et al. | 364/521 |
| 4,974,175 | 11/1990 | Suzuki et al. | 364/522 |
| 5,043,717 | 8/1991 | Takeda | 340/799 |
| 5,088,050 | 2/1992 | Ito | 395/142 |
| 5,131,080 | 7/1992 | Fredrickson et al. | 395/164 |
| 5,170,468 | 12/1992 | Shah et al. | 395/166 |
| 5,233,689 | 8/1993 | Rhoden et al. | 395/162 |
| 5,251,296 | 10/1993 | Rhoden et al. | 395/164 |
| 5,287,452 | 2/1994 | Newman | 395/166 |
| 5,311,211 | 5/1994 | Simpson | 345/189 |
| 5,329,617 | 7/1994 | Asal | 395/166 |
| 5,347,624 | 9/1994 | Takanashi et al. | 395/157 |
| 5,357,605 | 10/1994 | Rupel et al. | 395/164 |
| 5,486,876 | 1/1996 | Lew et al. | 348/719 |
| 5,517,609 | 5/1996 | Guillemaud et al. | 395/162 |

*Primary Examiner*—Matthew M. Kim
*Assistant Examiner*—U. Chauhan
*Attorney, Agent, or Firm*—Robert P. Bell; Steven A. Shaw

[57] ABSTRACT

A display controller for a computer or the like stored display data in a tiled format in a display memory. Tile shape may be dynamically altered depending upon display mode (resolution, pixel depth, or the like) or other display factors. Tile shape (height versus width) may be optimized for different types of display (e.g., video, text, graphics, or the like). A display memory address conversion apparatus may receive pixel position data (e.g., from a BIT BLT engine or the like) and tile shape data and convert pixel position data to a tiled display memory address.

32 Claims, 8 Drawing Sheets

| | | | | | | | |
|---|---|---|---|---|---|---|---|
| $P_{1,1}$ | $P_{1,2}$ | $P_{1,3}$ | · | · | $P_{1,1022}$ | $P_{1,1023}$ | $P_{1,1024}$ |
| $P_{2,1}$ | $P_{2,2}$ | $P_{2,3}$ | · | · | $P_{2,1022}$ | $P_{2,1023}$ | $P_{2,1024}$ |
| $P_{3,1}$ | $P_{3,2}$ | $P_{3,3}$ | · | · | $P_{3,1022}$ | $P_{3,1023}$ | $P_{3,1024}$ |
| $P_{4,1}$ | $P_{4,2}$ | $P_{4,3}$ | · | · | $P_{4,1022}$ | $P_{4,1023}$ | $P_{4,1024}$ |
| · | · | · | · | · | · | · | · |
| · | · | · | · | · | · | · | · |
| · | · | · | · | · | · | · | · |
| $P_{766,1}$ | $P_{766,2}$ | $P_{766,3}$ | · | · | $P_{766,1022}$ | $P_{766,1023}$ | $P_{766,1024}$ |
| $P_{767,1}$ | $P_{767,2}$ | $P_{767,3}$ | · | · | $P_{767,1022}$ | $P_{767,1023}$ | $P_{767,1024}$ |
| $P_{768,1}$ | $P_{768,2}$ | $P_{768,3}$ | · | · | $P_{768,1022}$ | $P_{768,1023}$ | $P_{768,1024}$ |

130

Figure 2A
(Prior Art)

| ADDRESS | BYTE $_1$ | BYTE $_2$ | BYTE $_3$ | . | . | BYTE $_{2047}$ | BYTE $_{2048}$ |
|---|---|---|---|---|---|---|---|
| 00000h | $P_{1,1}$ | $P_{1,2}$ | $P_{1,3}$ | . | . | $P_{2,1023}$ | $P_{2,1024}$ |
| 00800h | $P_{3,1}$ | $P_{3,2}$ | $P_{3,3}$ | . | . | $P_{4,1023}$ | $P_{4,1024}$ |
| 01000h | $P_{5,1}$ | $P_{5,2}$ | $P_{5,3}$ | . | . | $P_{6,1023}$ | $P_{6,1024}$ |
| 01800h | $P_{7,1}$ | $P_{7,2}$ | $P_{7,3}$ | . | . | $P_{8,1023}$ | $P_{8,1024}$ |
| 02000h | $P_{9,1}$ | $P_{9,2}$ | $P_{9,3}$ | . | . | $P_{10,1023}$ | $P_{10,1024}$ |
| 02800h | $P_{11,1}$ | $P_{11,2}$ | $P_{11,3}$ | . | . | $P_{12,1023}$ | $P_{12,1024}$ |
| 03000h | $P_{13,1}$ | $P_{13,2}$ | $P_{13,3}$ | . | . | $P_{14,1023}$ | $P_{14,1024}$ |
| 03800h | $P_{15,1}$ | $P_{15,2}$ | $P_{15,3}$ | . | . | $P_{16,1023}$ | $P_{16,1024}$ |
| 04000h | $P_{17,1}$ | $P_{17,2}$ | $P_{17,3}$ | . | . | $P_{18,1023}$ | $P_{18,1024}$ |
| . | . | . | . | . | . | . | . |
| . | . | . | . | . | . | . | . |
| . | . | . | . | . | . | . | . |
| BE800h | $P_{763,1}$ | $P_{763,2}$ | $P_{763,3}$ | . | . | $P_{764,1023}$ | $P_{764,1024}$ |
| BF000h | $P_{765,1}$ | $P_{765,2}$ | $P_{765,3}$ | . | . | $P_{776,1023}$ | $P_{766,1024}$ |
| BF800h | $P_{767,1}$ | $P_{767,2}$ | $P_{767,3}$ | . | . | $P_{768,1023}$ | $P_{768,1024}$ |

150

Figure 2B
(Prior Art)

| | | | | | | | |
|---|---|---|---|---|---|---|---|
| T0 | T1 | T2 | T3 | T4 | T5 | T6 | T7 |
| T8 | T9 | T10 | T11 | T12 | T13 | T14 | T15 |
| T16 | T17 | T18 | T19 | T20 | T21 | · | · |
| · | · | · | · | · | · | · | · |
| · | · | T354 | T355 | T356 | T357 | T358 | T359 |
| T360 | T361 | T362 | T363 | T364 | T365 | T366 | T367 |
| T368 | T369 | T370 | T371 | T372 | T373 | T374 | T375 |
| T376 | T377 | T378 | T379 | T380 | T381 | T382 | T383 |

130

Figure 3A

| ADDRESS | BYTE $_1$ | BYTE $_2$ | BYTE $_3$ | · | · | BYTE $_{2047}$ | BYTE $_{2048}$ |
|---|---|---|---|---|---|---|---|
| 00000h | $P0_{1,1}$ | $P0_{1,2}$ | $P0_{1,3}$ | · | · | $P0_{16,127}$ | $P0_{16,128}$ |
| 00800h | $P1_{1,1}$ | $P1_{1,2}$ | $P1_{1,3}$ | · | · | $P1_{16,127}$ | $P1_{16,128}$ |
| 01000h | $P2_{1,1}$ | $P2_{1,2}$ | $P2_{1,3}$ | · | · | $P2_{16,127}$ | $P2_{16,128}$ |
| 01800h | $P3_{1,1}$ | $P3_{1,2}$ | $P3_{1,3}$ | · | · | $P3_{16,127}$ | $P3_{16,128}$ |
| 02000h | $P4_{1,1}$ | $P4_{1,2}$ | $P4_{1,3}$ | · | · | $P4_{16,127}$ | $P4_{16,128}$ |
| 02800h | $P5_{1,1}$ | $P5_{1,2}$ | $P5_{1,3}$ | · | · | $P5_{16,127}$ | $P5_{16,128}$ |
| 03000h | $P6_{1,1}$ | $P6_{1,2}$ | $P6_{1,3}$ | · | · | $P6_{16,127}$ | $P6_{16,128}$ |
| 03800h | $P7_{1,1}$ | $P7_{1,2}$ | $P7_{1,3}$ | · | · | $P7_{16,127}$ | $P7_{16,128}$ |
| 04000h | $P8_{1,1}$ | $P8_{1,2}$ | $P8_{1,3}$ | · | · | $P8_{16,127}$ | $P8_{16,128}$ |
| · | · | · | · | · | · | · | · |
| · | · | · | · | · | · | · | · |
| · | · | · | · | · | · | · | · |
| BE800h | $P381_{1,1}$ | $P381_{1,2}$ | $P381_{1,3}$ | · | · | $P381_{16,127}$ | $P381_{16,128}$ |
| BF000h | $P382_{1,1}$ | $P382_{1,2}$ | $P382_{1,3}$ | · | · | $P382_{16,127}$ | $P382_{16,128}$ |
| BF800h | $P383_{1,1}$ | $P383_{1,2}$ | $P383_{1,3}$ | · | · | $P383_{16,127}$ | $P383_{16,128}$ |

150

Figure 3B

TILED MEMORY ADDRESSING WITH PROGRAMMABLE TILE DIMENSIONS

CROSS-REFERENCE TO RELATED APPLICATIONS

This application claims priority from U.S. Provisional Application Ser. No. 60/000,501 filed Jun. 23, 1995, entitled "TILED MEMORY ADDRESSING WITH PROGRAMMABLE TILE DIMENSIONS" and incorporated herein by reference.

FIELD OF THE INVENTION

The present invention relates to improvements in display controllers for computers, particularly high performance Video Graphics Adapters (VGAs) for personal computers using a tiled addressing scheme.

BACKGROUND OF THE INVENTION

FIG. 1 is a block diagram illustrating the major components of a prior art computer system 100 provided with a Video Graphics Adapter (VGA) display controller 110. Display controller 110 may generate pixel data for display 130 at a rate characteristic of the refresh rate of display 130 (e.g., 60 Hz, 72 Hz, 75 Hz, or the like) and the horizontal and vertical resolution of a display image (e.g., 640×480 pixels, 1024×768 pixels, 800×600 pixels or the like). A continuous stream of pixel data may be generated by display controller 110 at that characteristic rate.

Display controller 110 may be provided with a display memory 150 which may store pixel data in text, graphics, or video modes for output to display 130. Host CPU 140 is coupled to display controller 110 through bus 120 and may update the contents of display memory 150 when a display image to be generated on display 130 is to be altered. In addition, other devices (e.g., MPEG decoder or the like) may transfer video image data directly to display memory 150 for generating a video image on display 130.

Display memory 150 may comprise a DRAM (Dynamic Random Access Memory) or the like. A characteristic of DRAMs is that they are organized as a two-dimensional array of bit cells, divided into rows and columns of bit cells. DRAMs replicate these arrays once for each I/O bit. For example, a 16-bit wide DRAM has 16 arrays each of which contributes one data bit. Accessing a row of the array causes that row to be cached in the DRAM. Subsequent accesses to data words in different columns of the same row (column accesses) are much faster than accesses to different rows (row accesses).

Accesses within a row may be made in what is known as page mode, whereas accessed to different rows may require a page miss, or random access memory cycle. A page mode access may take on the order of 2–4 memory clock cycles, whereas a random access may take on the order of 6–9 memory clock cycles. In order to enhance performance of a video controller, it is preferable to remain in page mode and thus minimize the number of row accesses.

For graphics and video modes, in order to provide a continuous pixel stream at the characteristic rate of display 130, pixel data may be stored in display memory in a sequentially addressed format corresponding to scan line order of the display. In other words, the first pixel data to be output to display 130 may be at a first address, second pixel data at a second sequential address, and so on.

FIGS. 2A and 2B illustrate a how a prior art display memory 150 may be organized on a scan line basis. FIG. 2A illustrates display 130 comprising a number of pixels organized into scan lines. For the purposes of illustration, not all pixels are shown. Each pixel is represented by $P_{x,y}$ where x indicates scan line and y indicates position within a scan line.

In the example of FIG. 2A, 768 lines are provided, each having 1024 pixels (1024×768 resolution) at eight bits per pixel (pixel depth). FIG. 2B is a memory map illustrating how individual pixel data is stored within display memory 150. The addresses shown in FIG. 2B are by way of example for illustrative purposes only. Actual display memory addresses may of course, differ.

In FIG. 2B, display memory 150 may comprise a display memory having a row size of 2048 bytes. Thus, data for two scan lines for display 130 may be stored within one row of display memory 150, as illustrated in FIG. 2B. Each pixel $P_{x,y}$ may be stored in a different byte location in display memory 150 where x represents scan line number (1–768) and y represents pixel location (1–1024). Each scan line to be displayed on display 130 may be stored within a page or pages of display memory 150, allowing for the use of page mode addressing when outputting data. Such an ordering technique allows for quick sequential output of pixel data to display 130. When data is to be retrieved from simply memory 150 to refresh display 130, individual pixel data may be retrieved in successive fashion from display memory 150 using page mode access.

However, with the advent of advanced graphics and video display images (e.g., MotionVideo™ images, Windows™ images, or the like) such a sequential, scan-line based addressing scheme may create a bottleneck at when data is input to display memory 150. Graphics operations have certain characteristics which may be different than other memory applications in that graphics operations are two-dimensional (i.e., representing two-dimensional images). Graphics operations on pixel frame buffers generally fall into two classes; those which access the frame buffer in raster scan (left-to-right, top-to-bottom) order (e.g., CRT refresh or screen rewrite) and those which access the frame buffer in random accesses (e.g., window draw or the like).

As discussed above, raster scan accesses may be made in a page mode if display memory 150 is organized in a raster scan format. However, random accesses may force page misses. In such situations, in the prior art, host CPU 140 may determine a block of data to be updated to display memory 150, translate the pixel addresses to correspond to display memory addresses, and transfer such data to display memory 150 during a CPU cycle. As only a portion of a number of scan lines may be updated, a large number of page misses may be forced during such a transfer, slowing down the CPU cycle and impairing performance of host CPU 140.

Such random accesses may not be truly random, however, but rather have a high locality reference in X-Y space. In other words, such random accesses may tend to have X,Y addresses close to those of a previously accessed pixel. For example, bit-block-transfer (bitblt) operations read and write data in rectangular blocks in X,Y space. Such bitblt rectangles may be relatively square.

Thus, one alternative to the a prior art approach is to organize display memory 150 on a tiled basis rather than a scan line basis. FIGS. 3A and 3B illustrate a display image and memory organization for a tiled image. FIG. 3A illustrates display 130 where an image may be divided into a number of tiles, each of which may be stored on a page or pages of memory. In the example of FIG. 3A, a 1024×768 image having a pixel depth of 8 bits per pixel is divided into 384 tiles. Each tile may be 128 bytes wide and 16 lines tall, representing a rectangle of 128 pixels wide and 16 lines in height. The overall arrangement of tiles comprises 48 rows of eight tiles apiece. Of course, other pixel resolutions or tile sizes may be used, as is known in the art.

FIG. 3B illustrates a memory map of display memory 150 using a tiled addressing mode. In the example of FIG. 3B, again, display memory 150 may be provided with a row size of two kilobytes (2048 bytes) and display 130 may be configured having a 1024×768 resolution at 8 bits-per-pixel. These resolutions and memory sizes are used by way of illustration only and are not intended to limit the scope of the present invention.

Unlike the example of FIGS. 2A and 2B, however, display memory 150 of FIG. 3B may be organized in a tile fashion. Each row of display memory 150 may contain data for an individual tile. In the example of FIG. 3A, each tile may comprise a rectangle of 128 ×16 pixels, or 2048 pixels. In FIG. 3B, each pixel for a tile may be represented by $PZ_{x,y}$ where Z represents tile number (0–383), x the row number in the tile (1–16) and y the pixel position within a row (1–28).

As illustrated in FIG. 3B, each pixel within a tile may be represented by a corresponding byte in a corresponding row of memory. Pixels for each tile may be ordered within a row of memory in a scan-line format (e.g., left to right, top to bottom) or in another format. By providing pixel data in a tiled addressing format, the speed of data transfer from host CPU 140 to display memory 150 may be increased.

Such a system may increase the complexity of addressing when outputting pixel data to display 130, however, such increased complexity is more than compensated by the decreased complexity in transferring blocks of images from host CPU 140. If host CPU 140 is to transfer a block of pixel data within a tile boundary, such a transfer may take place almost entirely in page mode. The use of tiling thus reduces CPU cycle time, freeing up host CPU 140 for other tasks and generally improving performance. If a block of pixel data to be transferred crosses one or more tile boundaries, however, page breaks may occur.

Thus, depending upon application type, a particular tile sizes (i.e., aspect ratio) may provide optimal performance, depending upon the type of data being transferred. For example, transfers of text data may perform optimally with long, narrow tiles sized to cover a line or a portion of a line of text. Graphical images and video, on the other hand, may be optimized using taller, more rectangular or square tile shapes.

An example of one prior art memory addressing system is illustrated by Bruce, U.S. Pat. No. 4,546,451, issued Oct. 8, 1995 entitled "RASTER GRAPHICS DISPLAY REFRESH MEMORY ARCHITECTURE OFFERING RAPID ACCESS SPEED" and incorporated herein by reference. Bruce teaches that the access speed of a raster graphics refresh architecture may be increased by forming a two-dimensional cell of storage locations on a single page corresponding to a region on the display. A portion of the RAM device column address is allocated to the first n least significant bits of the X display address and another portion of the column address is allocated to the first m least significant bits of the Y display address, thereby defining an n by m cell on one page of the device which maps to a corresponding region on the graphics display (See, e.g., Col. 7, lines 5–16, and FIG. 2).

However, the apparatus of Bruce does not appear to provide for programmable tile dimensions, and thus the dimensions of the "cell" do not appear to be able to be optimized for particular graphics applications. Moreover, by setting the X dimension as a power of two (e.g., $2^n$), it may be difficult to set tile sizes as wide a row width where display resolution horizontal dimensions are not set at a power of 2 (e.g., 640 by 480, 800 by 600, 1280 by 1024). In addition, it appears that the apparatus of Bruce may be limited to a conventional DRAM display memory and it is not clear how the apparatus of Bruce could be adapted, if at all, to more modern display memory types.

SUMMARY AND OBJECTS OF THE INVENTION

A display controller receives and stores display data in a display memory in a tiled address format. A tile shape determining apparatus determines optimal tile shape data from a predetermined range of tile shape data. A display memory address generator processes tile shape data with pixel location data to generate display memory address data.

The tile shape determining apparatus may comprise a first register for storing display mode data indicative of at least a display mode of the display controller. A look-up table, coupled to the first register receives the display mode data and outputs tile shape data. A second register, coupled to the look-up table stores tile shape data. Tile shape data comprises tile size data, tile height data, and tile pitch data. Pixel location data comprises X and Y position data.

The display memory address generator may comprise a first divider which divides the tile size data with the tile height data and outputs tile width data. A second divider divides the X position data with the tile width data and outputs horizontal tile position data and horizontal pixel position within a horizontally adjacent tile A third divider divides the Y position data and the tile height data and outputs vertical tile position and vertical pixel position within a vertically adjacent tile.

A first multiplier multiplies the tile width data and the vertical position within a vertically adjacent tile and outputs a first multiplied value. A first adder adds the first multiplied value and the horizonal tile position and outputs a first added value. A second multiplier multiplies the vertical tile position and the tile pitch data and outputs a second multiplied value. A second adder adds the horizontal tile value and the second multiplied value and outputs a second added value. A third multiplier multiplies the tile size data and the second added value and outputs a third multiplied value. A third adder adds the first added value and the third multiplied value and outputs a display memory address.

It is an object, therefore, of the present invention to provide adjustability for tile dimensions in a tiled memory addressing scheme.

It is a further object of the present invention to optimize tile dimensions in a tiled memory addressing scheme such that tile dimensions are optimized for sizes and shapes of blocks of pixel data to be transferred to display memory.

It is a further object of the present invention to generate a tiled display address in response to pixel coordinate data.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention.

Accordingly, the drawing and description are to be regarded as illustrative in nature, and not as restrictive.

BRIEF DESCRIPTIONS OF THE DRAWINGS

FIGS. 2A and 2B are diagrams illustrating a how a prior art display memory may be organized on a scan line basis.

FIGS. 3A and 3B are diagrams illustrating a display image and memory organization for a tiled image.

DETAILED DESCRIPTION OF THE INVENTION

Figure 1:
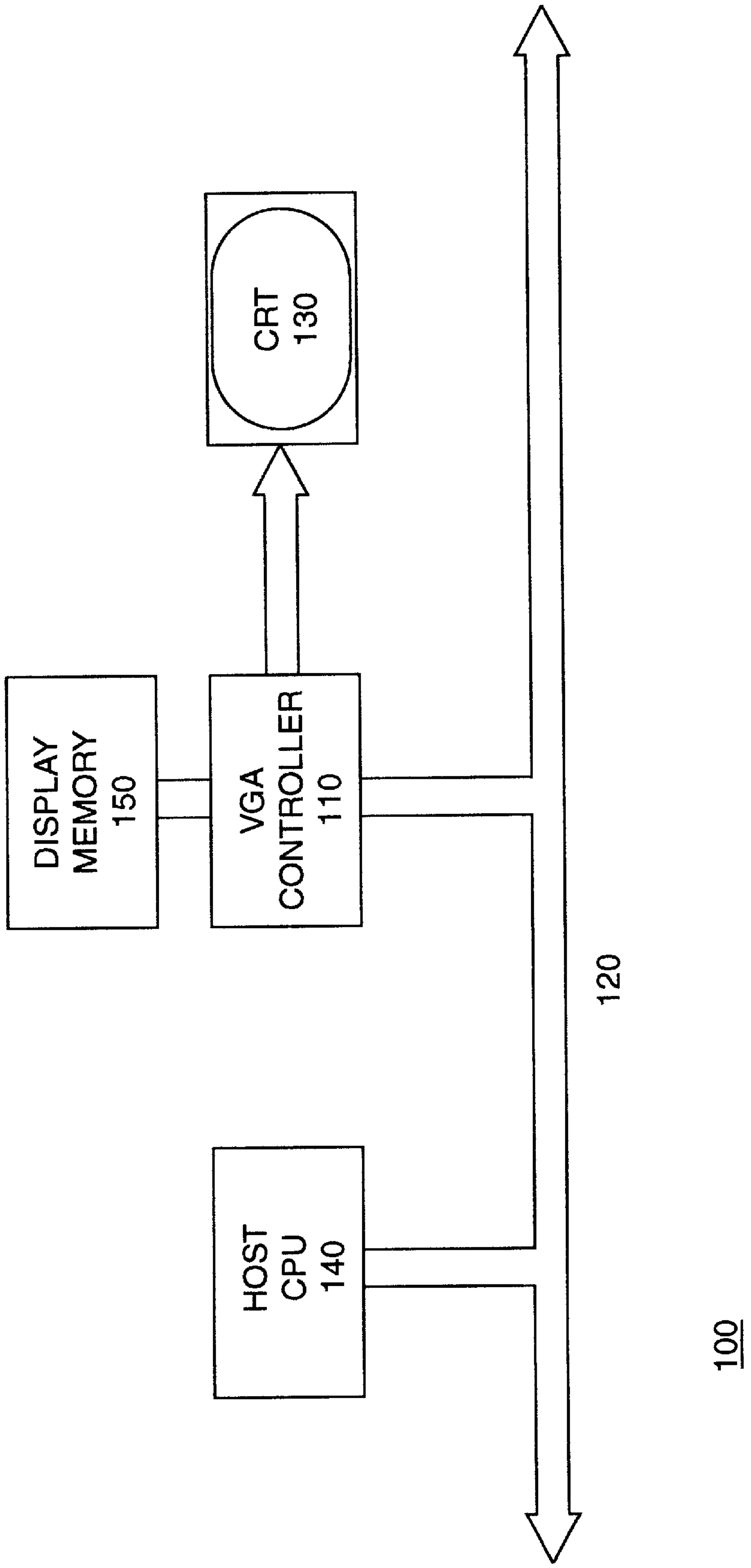
Figure 1 (Prior Art)
FIG. 1 is a block diagram illustrating the major components of a prior art computer system provided with a Video Graphics Adapter (VGA) display controller.
Figure 4:
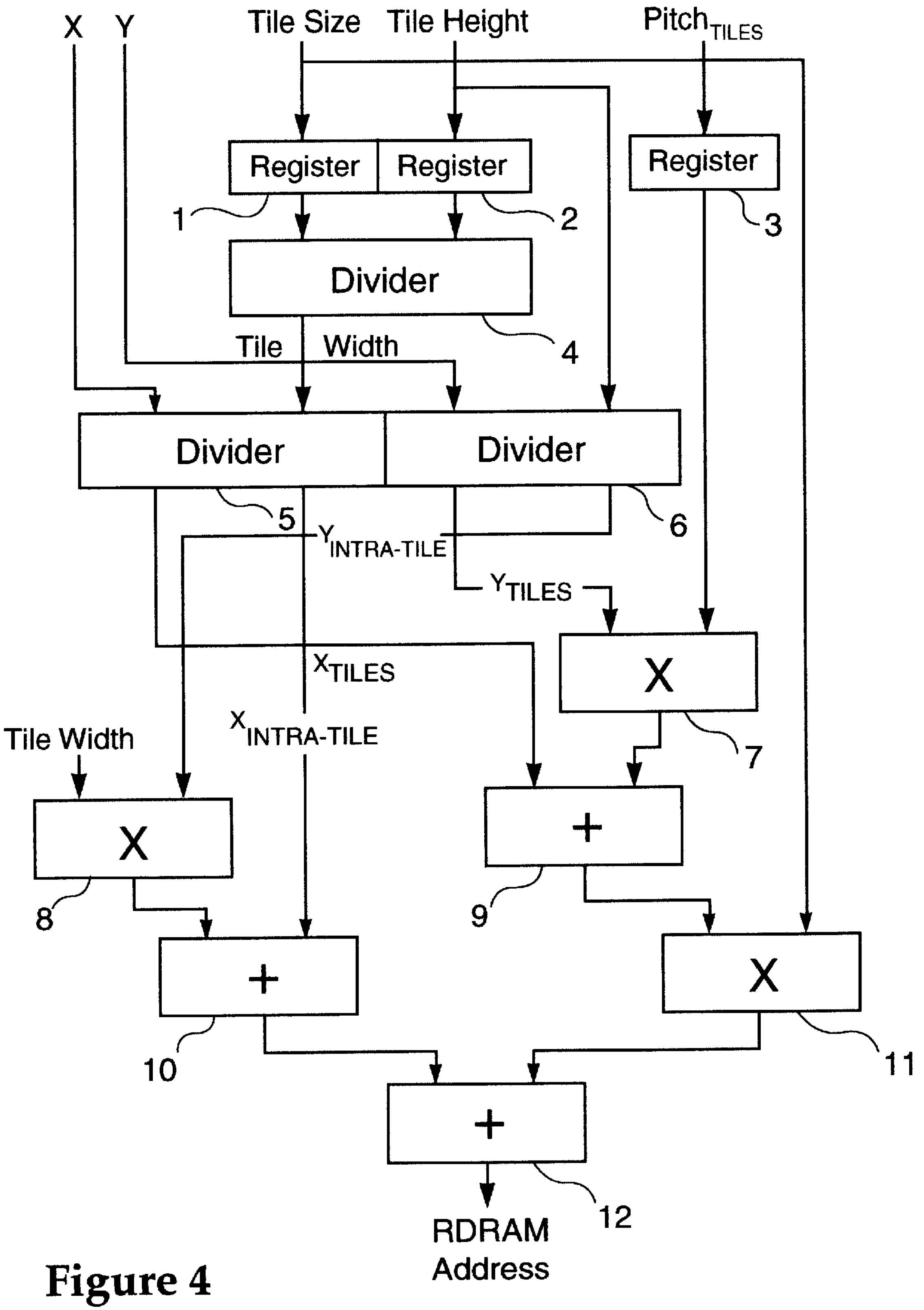
FIG. 4 is a block diagram of the apparatus of the present invention.

FIG. 4 is a block diagram of an apparatus of the present invention for converting X and Y pixel coordinates into a DRAM address. The apparatus of FIG. 4 may also be provided with tile size and tile height inputs, and well as a tile pitch input to allow the tile dimensions to be altered by a video controller to optimize performance.

Figure 5:
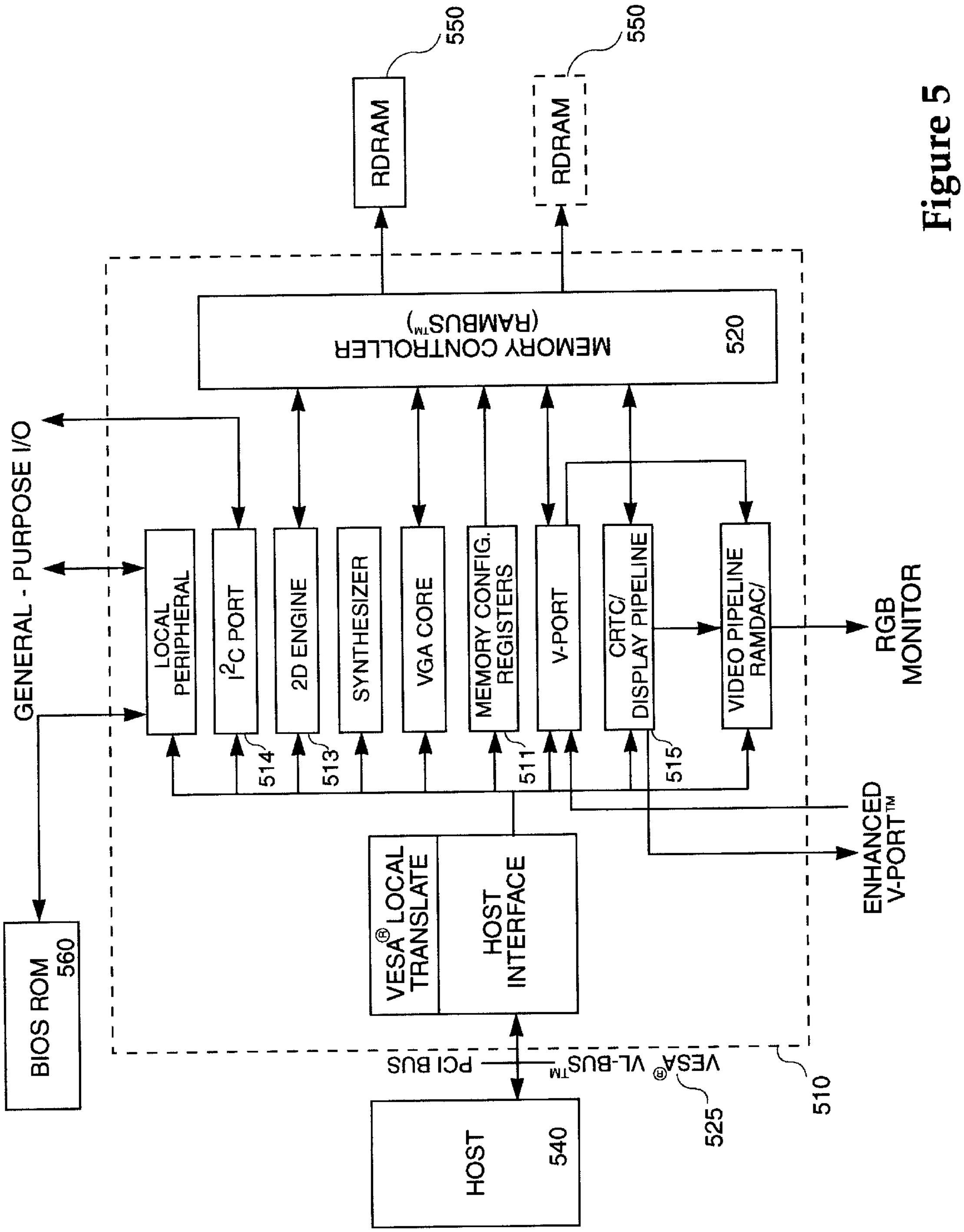
FIG. 5 is a block diagram illustrating the implementation of the present invention in the preferred embodiment.

The apparatus of the present invention may be provided within a graphics controller integrated circuit, particularly within a graphics controller integrated circuit provided with a BITBLT engine. FIG. 5 is a block diagram illustrating the best mode of the present invention as embodied by Cirrus Logic part number CL-GD5462, described in the *CL-GD*5462 *Advanced Data Book* and the *Laguna* 1 *Design Specification*, both of which are incorporated herein by reference. The memory addressing apparatus of FIG. 4 may be provided within one or more elements of graphics controller circuit 510. In the preferred embodiment, the apparatus of FIG. 5 is provided within 2D engine (BIT BLT engine) 513, $I^2C$ port 514, and CRTC/display pipeline 515. Each of these elements may transfer data through memory controller 520 to Rambus™ RDRAM(s) 550 as described in the *CL-GD*5462 *Advanced Data Book* and the *Laguna* 1 *Design Specification*, both of which are incorporated herein by reference.

In FIG. 5, controller 510 may be coupled to host CPU 540 through system bus (PCI BUS) 525. Display memory may be provided in the form of RAMBUS™ RDRAM(s) 550. RAMBUS™ RDRAM(s) 550 may provide particular memory architecture and addressing techniques which the present invention may utilize to particular advantage. In particular, RAMBUS™ RDRAM(s) 550 may provide a memory having a row width of 2048 Bytes—sufficient to store pixel data for a fairly large tile size. The operation of RAMBUS RDRAM(s) 550 is described for example, in RAMBUS™ APPLICATION NOTE: *APPLYING RAMBUS™ TECHNOLOGY TO GRAPHICS*, incorporated herein by reference.

Memory configuration registers 511 may store data values indicating the configuration of RAMBUS™ RDRAM(s) 550. Such data values may be loaded upon reset from BIOS ROM 560 or may be programmed from Host CPU 540. Data values in memory configuration registers 511 may indicate whether RAMBUS™ RDRAM(s) 550 are in tiled mode, and if so, what the dimensions of such tiles are. Memory controller 512 may utilize these data values, as discussed below in connection with FIG. 4, to translate X Y coordinates of a bit block transfer into memory addresses for RAMBUS™ RDRAM(s) 550.

FIG. 4 is a block diagram illustrating the operation of a portion of memory controller 512 of FIG. 5 in translating X and Y pixel addresses into tiled memory addresses. Referring now to FIG. 4, X and Y coordinates are fed to dividers 5 and 6, respectively. Coordinates X and Y represent absolute coordinates of a pixel as located within an image. Coordinate X may represent the location of a pixel in the X direction (i.e., position within a line) from the left hand side of the screen. Coordinate Y may represent the location of a pixel in the Y direction (i.e., scan line number) from the top of the screen. Thus, for example, in a 1024×768 image, X may take a value from 0 to 1023 and Y may take a values from 0 to 767.

Parameters TileSize, TileHeight, and $Pitch_{TILES}$ may be programmable parameters stored in software registers 1, 2, and 3 of Memory configuration registers 511 of FIG. 5. Programmable registers 1, 2, and 3 allow changing of the operation of the circuit under software control to allow optimizing of tile mapping for each display configuration. The TileSize parameter indicates the overall size of each tile (in bytes) and may be determined by the physical parameters (e.g., memory row size) of RAMBUS™ RDRAM(s) 550 of FIG. 5. In the preferred embodiment, RAMBUS™ RDRAM (s) 550 of FIG. 5 have a row width of 2048 bytes and thus TileSize may be pre-set or programmed to 2048 bytes.

The remaining parameters TileHeight and $Pitch_{TILES}$ may be determined by software depending upon video mode, resolution, and pixel depth, as will be discussed in more detail below. Parameter TileHeight indicates the height of each tile in scan lines. Parameters Tilesize and TileHeight are fed to Divider 4 to output parameter TileWidth. Parameter TileWidth indicates the width of each tile in bytes.

As discussed above, TileSize (in bytes) may be determined by the architecture of RAMBUS™ RDRAM 550. For example, RAMBUS™ RDRAM 550 may be provided having a row width of 2048 bytes, and thus TileSize may be limited to 2048 bytes or 2048 pixels at an 8 bit-per-pixel depth, or other number of pixels at other pixel depths. Of course, other types of display memories may be used in place of RAMBUS™ RDRAM without departing from the spirit and scope of the present invention. Moreover, multiple RAMBUS™ RDRAMs may be used to increase TileSize.

Value TileWidth and a pixel X coordinate may be fed to divider 5 to output value $X_{TILES}$ as the dividend, and intermediate value $X_{INTRA\text{-}TILE}$ as remainder. Value $X_{TILES}$ value indicates the number of tiles in the X direction that a pixel having coordinates X,Y is located from the left hand side of the screen. Value $X_{INTRA\text{-}TILE}$ is an intermediate value representing the X coordinate (pixel position) within a tile where the pixel having coordinates X,Y is located.

Value TileHeight and a pixel Y coordinate may be fed to divider 6 to output value $Y_{TILES}$ as the dividend, and intermediate value $Y_{INTRA\text{-}TILE}$ as remainder. Value $Y_{TILES}$ indicates the number of tiles in the Y direction that a pixel having coordinates X,Y is located from the top of the screen. Value $Y_{INTRA\text{-}TILE}$ is an intermediate value representing the Y coordinate (scan line) within a tile where the pixel having coordinates X,Y is located.

Thus, for example, a 347th pixel (i.e., X=347) located on scan line 27 (i.e., Y=27) of a 1024×768 image (at 8 bpp) may be translated into $X_{TILES}$, $Y_{TILES}$, $X_{INTRA\text{-}TILE}$, and $Y_{INTRA\text{-}}$ $_{TILE}$ values for the 384 tiled memory configuration of FIG. 3A as follows. From the example of FIG. 3A, TileSize may be set to 2048 bytes.

Thus, for example, a 347th pixel (i.e., X=347) located on scan line 27 (i.e., Y=27) of a 1024×768 image (at 8 bpp) may be translated into $X_{TILES}$, $Y_{TILES}$, $X_{INTRA\text{-}TILE}$, and $Y_{INTRA\text{-}TILE}$ values for the 384 tiled memory configuration of FIG. 3A as follows. From the example of FIG. 3A, TileSize may be set to 2048 bytes. Parameter TileHeight may be set to 16, representing a tile with a height of 16 lines. Parameter TileWidth may be calculated in divider 4 as TileSize/TileHeight or 2048/16=128 bytes, representing a tile 128 pixels wide at 8 bits per pixel.

Values $X_{TILE}$ and $X_{INTRA\text{-}TILE}$ may be calculated in divider 5 as X/TileWidth or 347/128 or 2 with remainder 91. Values $Y_{TILE}$ and $Y_{INTRA\text{-}TILE}$ may be calculated in divider 6 as Y/TileHeight or 27/16 or 1 with remainder 11. Thus, a pixel with coordinates X and Y will be located in the 91th position of the 9th line of a tile located after a second tile in the X direction and after the first row of tiles (e.g., tile T10 of FIG. 3A). Values $X_{TILE}$, $X_{INTRA\text{-}TILE}$, $Y_{TILE}$, and $Y_{INTRA\text{-}TILE}$ may then be fed to multipliers and adders 7, 8, 9, 10, 11, and 12 to output a DRAM address as follows.

Prior art frame buffers have a characteristic known as pitch which may be defined as a number of bytes of data for each horizontal line of a display. For example, in a 1024 by 768 pixel resolution display having a pixel depth of 16 bits per pixel, pitch would equal 1024×2 bytes or 2048 bytes per line. The DRAM address in a prior art frame buffer (e.g., scan line mapped) may related to the X,Y pixel address illustrated in Equation 1.

$$\text{DRAMaddress}=(Y\times\text{Pitch}+X)\times\text{bytes/pixel}$$

EQUATION 1

The pitch of a tiled frame buffer is in terms of an integer number of tiles, not bytes. $\text{Pitch}_{TILES}$ is thus equal to an integer number of tiles per line. For some resolutions, $\text{Pitch}_{TILES}$ may be rounded up to the next higher integer number. For example, for an 800 by 600 pixel resolution image at a pixel depth of 8 bits per pixel and a tile size 256 bytes wide, pitch may be rounded up to 4 tiles (4×256=1024) as 800 is not evenly divisible by 256. For the example where pixel resolution is 1024×768 pixels at a depth of 8 bits per pixel, $\text{Pitch}_{TILES}$ may be equal to 8, where each tile has a size of 128 pixels by 16 lines. The DRAM address is related to the X,Y address as illustrated in EQUATION 2 below.

$$\text{DRAMaddress}=[(Y_{TILES}\times\text{Pitch}_{TILES}+X_{TILES})\times\text{TileSize}+Y_{INTRATILE}\times\text{TileWidth}+X_{INTRATILE}]\times\text{bytes/pixel}$$

Where:

TileSize is the number of pixels in a tile, which is the same as the number of pixels which may fit into one row of the DRAM array and may be a fixed value characteristic of the memory technology.

TileHeight is the number of scan lines in a tile, and may be programmable. Since TileSize may be fixed for a given memory technology, programming with TileHeight may determine TileWidth.

TileWidth is the TileSize divided by TileHeight and is thus programmable.

$X_{TILES}$ is the X tile location of a pixel=X/ TileWidth $Y_{TILES}$ is the Y tile location of a pixel=Y/ TileHeight $\text{Pitch}_{TILES}$ is the pitch expressed in tiles. Pitch in bytes may be expressed as $\text{Pitch}_{TILES}\times\text{TileWidth}$.

$X_{INTRA\text{-}TILE}$ is the X location within a tile, where $X_{INTRA\text{-}TILE}=X-X_{TILES}\times\text{TileWidth}$.

$Y_{INTRA\text{-}TILE}$ is the Y location within a tile, where $Y_{INTRA\text{-}TILE}=Y-Y_{TILES}\times\text{TileHeight}$.

EQUATION 2

Thus, for the example given above, the DRAM address for the X=347 and Y=27 may be calculated as follows:

$$\text{DRAMaddress}=[(Y_{TILES}\times\text{Pitch}_{TILES}+X_{TILES})\times\text{TileSize}+Y_{INTRA\text{-}TILE}\times\text{TileWidth}+X_{INTRATILE}]\times\text{bytes/pixel}$$

$$\text{DRAMaddress}=[(1\times8\times2)\times2048+11\times128+91[\times1=[(16)\times2048+1408+91[=32768+1408+91=34267=85\text{ DBh}$$

Optimal programming of TileHeight may be performed by graphics driver software and may be performed by locking the optimal values in a table based upon programmed display parameters such as CRT resolution, number of bits-per-pixel and display of real-time video. Software implemented within the VGA BIOS may reset parameters TileHeight and $\text{Pitch}_{TILES}$ according to a look-up table.

Actual performance data for a particular implementation may determine optimal tile sizes for given resolutions and pixel depths. In general, with an increased number of bits-per-pixel (bpp) or pixel depth, wider tile widths may be optimal. Similarly, with a fewer number of bits per pixel, a narrower, taller tile may be more optimal. In addition, higher pixel resolutions (or in general, any change which may increase memory bandwidth used for CRT refresh) may be optimally implemented with a wider tile width. In the preferred embodiment, two tile heights may be provided; eight rows (256 pixels wide) or 16 rows (128 pixels wide). However, other tile sizes and heights may be implemented without departing from the spirit and scope of the present invention.

Figure 6:
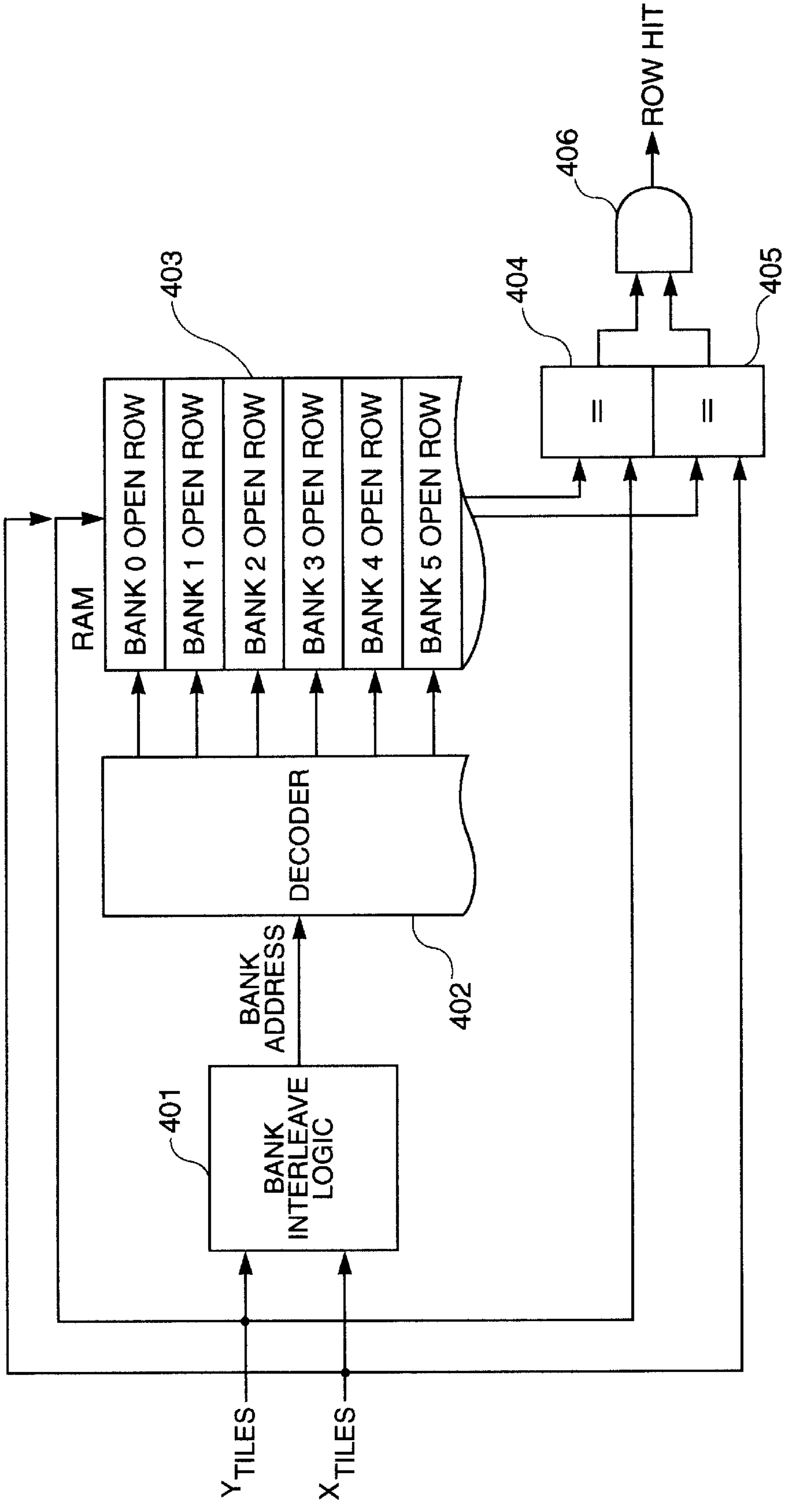
FIG. 6 is a block diagram for Address Comparison Logic within memory controller 520 of FIG. 5 for determining whether an access is to a memory row already loaded in an RDRAM row cache.

FIG. 6 is a block diagram for Address Comparison Logic within memory controller 520 of FIG. 5 for determining whether an access is to a memory row already loaded in an RDRAM row cache. Accesses to already cached rows may be faster than accesses to other rows (which may require a row access). The former may be referred to as a "row hit" while the latter may be referred to as a "row miss" or "page break".

In a memory system comprising one RDRAM bank, tile addresses $Y_{TILES}$ and $X_{TILES}$ select a row within RDRAM 550. In a memory system comprising more than one bank of RDRAM, selected bits of $Y_{TILES}$ and $X_{TILES}$ select the bank, as determined by bank interleave logic 401. The remaining bits of $Y_{TILES}$ and $X_{TILES}$ may be used to select a row within RDRAM(s) 550.

As illustrated in FIG. 6, addresses $X_{TILES}$ and $Y_{TILES}$ are supplied to bank interleave logic 401 which in turn may select certain bits from addresses $X_{TILES}$ and $Y_{TILES}$ as determined by programmable registers within bank interleave logic 401 to form a bank address. The bank address may then be supplied to decoder 402 which in turn addresses RAM 403. RAM 403 may then supply an address of a presently open row (i.e., cached in the RDRAM 550 row cache) for that bank.

Appropriate bits of the row address are compared to the $Y_{TILES}$ and $X_{TILES}$ address by comparators 404 and 405. If they are both equal, AND gate 406 asserts a row hit signal. If they are not both equal, the row hit signal is de-asserted. When the row hit signal is de-asserted, memory controller 520 of FIG. 5 may perform a new row access. The new row address may then be written to a corresponding word of RAM 403 addressed by the present bank address to indicate which row is presently cached in a bank of RDRAM(s) 550.

If a row hit is asserted, memory controller 520 of FIG. 5 may transfer data to or from RDRAM(s) 550 immediately.

If a row hit is not asserted, memory controller 520 of FIG. 5 may first may first perform a row access to load a requested row of data into the row cache of the selected bank of RDRAM(s) 550. After an appropriate delay, data may then be transferred to or from RDRAM(s) 550. As the address comparison logic compares the row address to that presently cached on every access, it performs a row access only when actually required. In the prior art, every random access (i.e., not incrementing or decrementing X and/or Y from the previous access) is assumed to be a row miss and thus a row access may always be performed, thus decreasing overall performance.

A display controller may be implemented to use a variable number of banks of RDRAM(s) 550. In the example of FIG. 6, the preferred embodiment, decoder 402 and RAM 403 may be implemented to have one word for each possible bank of RDRAM(s) 550.

If the largest number of possible banks of RDRAM(s) 550 is very large, it may be undesirable for cost and performance reasons to implement decoder 402 and RAM 403 of sufficient size to have one word for each possible bank of RDRAM(s) 550. In such a case, decoder 402 and RAM 403 may be provided with fewer words than the number of banks of RDRAM(s) 550. The available words within RAM 403 may hold the last accessed row for each of the most recently accessed banks, using a Least Recently Used replacement algorithm as is known in the prior art. In such a case, the word size of RAM 403 may be increased to hold a bank address as well. If no word contains an address of a bank being accessed, the row hit signal may be de-asserted, forcing memory controller 550 of FIG. 5 to perform a row access and write the row and bank address to the lease recently accessed word.

At power up, the contents of RAM 403 may not be valid (i.e., noise data). It may, therefore, be necessary to perform one read to each bank of RDRAM(s) 550 to cause a row address for each bank of RDRAM(s) to be loaded to RAM 403. Actual data read may not be valid and is unimportant. After performing one read from each bank of RDRAM(s) 550, the contents of RAM 403 may now correspond to a row cached within each bank of RDRAM(s) 550.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

For example, in the apparatus of FIG. 4, parameters TileSize and TileHeight are utilized to calculate TileWidth and DRAM address. However, as would be readily apparent to one of ordinary skill in the art, parameters TileSize and TileWidth may be utilized to calculate TileHeight. Moreover, in the preferred embodiment, tile shape (height versus width) may be altered in response to video mode (e.g., pixel resolution, pixel depth, or the like). However, it is within the spirit and scope of the present invention to alter tile shape in response to other display parameters or in response to operating system or applications software commands, or by user input.

In the preferred embodiment, tile size may be determined by hardware parameters such as display memory width. However, it is also within the spirit and scope of the present invention to provide hardware and/or software control of tile size.

Moreover, in the preferred embodiment, Rambus™ RDRAMs are illustrated for use with the present invention. However, one of ordinary skill in the art may appreciate that other types of DRAMs may be utilized within the spirit and scope of the present invention.

What is claimed is:

1. A display controller for receiving and storing display data in a display memory in a tiled address format, said display controller comprising:

tile shape storage means for storing tile shape data comprising tile size data, tile height data, and tile pitch data;

pixel location data input means, for receiving pixel data location data comprising X and Y position data; and display memory address generating means, coupled to said pixel location data input means for processing tile shape data with the pixel location data to generate display memory address data wherein said display memory address generating means comprises:

a first divider means, for receiving the tile size data and the tile height data and outputting tile width data;

a second divider means, coupled to said first divider means and said pixel location data input means, for receiving the X position data and the tile width data and outputting horizontal tile position and horizontal pixel position within a horizontally adjacent tile; and a third divider means, coupled to said first divider means and said pixel location data input means, for receiving the Y position data and the tile height data and outputting vertical tile position and vertical pixel position within a vertically adjacent tile.

2. The display controller of claim 1, wherein said display memory address generating means further comprises:

first multiplier means, coupled to said first divider means and said third divider means, for receiving the tile width data and the vertical pixel position within a vertically adjacent tile and outputting a first multiplied value;

first adder means, coupled to said first multiplier means and said second divider means, for receiving the first multiplied value and the horizontal pixel position within a horizontally adjacent tile and outputting a first added value;

second multiplier means, coupled to said third divider means and said tile shape storage means, for receiving the vertical tile position and the tile pitch data and outputting a second multiplied value;

second adder means, coupled to said second divider means and the second multiplier means, for receiving the horizontal tile position and the second multiplied value and outputting a second added value;

third multiplier means, coupled to said second adder means and said tile shape storage means, for receiving the tile size data and the second added value and outputting a third multiplied value; and third adder means, coupled to said first adder means and said third multiplier means, for receiving the first added value and the third multiplied value and outputting a display memory address.

3. A display controller for receiving and storing display data in a display memory in a tiled address format, said display controller comprising:

tile shape determining means for determining optimal tile shape data from a predetermined range of tile shape data;

pixel location data input means, for receiving pixel data location data; and display memory address generating means, coupled to said pixel location data input means and said tile shape determining means, for processing tile shape data with the pixel location data to generate display memory address data, wherein said tile shape determining means comprises:

first register means for storing display mode data indicative of at least a display mode of said display controller;

look-up table means, coupled to said first register means, for receiving the display mode data and outputting tile shape data; and second register means, coupled to said look-up table means, for storing tile shape data.

4. The display controller of claim 3, wherein the tile shape data comprises tile size data, tile height data, and tile pitch data.

5. The display controller of claim 4, wherein the pixel location data comprises X and Y position data.

6. The display controller of claim 5, wherein said display memory address generating means comprises:

a first divider means, for receiving the tile size data and the tile height data and outputting tile width data;

a second divider means, coupled to said first divider means and said pixel location data input means, for receiving the X position data and the tile width data and outputting horizontal tile position and horizontal pixel position within a horizontally adjacent tile; and a third divider means, coupled to said first divider means and said pixel location data input means, for receiving the Y position data and the tile height data and outputting vertical tile position and vertical pixel position within a vertically adjacent tile.

7. The display controller of claim 6, further comprising:

first multiplier means, coupled to said first divider means and said third divider means, for receiving the tile width data and the vertical pixel position within a vertically adjacent tile and outputting a first multiplied value;

first adder means, coupled to said first multiplier means and said second divider means, for receiving the first multiplied value and the horizontal pixel position within a horizontally adjacent and outputting a first added value;

second multiplier means, coupled to said third divider means and said second register means, for receiving the vertical tile position and the tile pitch data and outputting a second multiplied value;

second adder means, coupled to said second divider means and the second multiplier means, for receiving the horizontal tile position and the second multiplied value and outputting a second added value;

third multiplier means, coupled to said second adder means and said second register means, for receiving the tile size data and the second added value and outputting a third multiplied value; and third adder means, coupled to said first adder means and said third multiplier means, for receiving the first added value and the third multiplied value and outputting a display memory address.

8. The display controller of claim 3, wherein the pixel location data input means comprises a bit block transfer engine for generating bit block transfers of pixel data.

9. A computer system for generating a display image, said computer system comprising:

a host processor for processing and generating display image data;

a display memory, coupled to said host processor, for storing the display image data; and a display controller, coupled to said host processor and said display memory, for receiving and storing display data in a display memory in a tiled address format, said display controller comprising:

tile shape storage means for storing tile shape data comprising tile size data, tile height data, and tile pitch data;

pixel location data input means, for receiving pixel data location data comprising X and Y position data; and display memory address generating means, coupled to said pixel location data input means for processing tile shape data with the pixel location data to generate display memory address data wherein said display memory address generating means comprises:

a first divider means, for receiving the tile size data and the tile height data and outputting tile width data;

a second divider means, coupled to said first divider means and said pixel location data input means, for receiving the X position data and the tile width data and outputting horizontal tile position and horizontal pixel position within a horizontally adjacent tile; and a third divider means, coupled to said first divider means and said pixel location data input means, for receiving the Y position data and the tile height data and outputting vertical tile position and vertical pixel position within a vertically adjacent tile.

10. The computer system of claim 9, wherein said display memory address generating means further comprises:

first multiplier means, coupled to said first divider means and said third divider means, for receiving the tile width data and the vertical pixel position within a vertically adjacent tile and outputting a first multiplied value;

first adder means, coupled to said first multiplier means and said second divider means, for receiving the first multiplied value and the horizontal pixel position within a horizontally adjacent tile and outputting a first added value;

second multiplier means, coupled to said third divider means and said tile shape storage means, for receiving the vertical tile position and the tile pitch data and outputting a second multiplied value;

second adder means, coupled to said second divider means and the second multiplier means, for receiving the horizontal tile position and the second multiplied value and outputting a second added value;

third multiplier means, coupled to said second adder means and said tile shape storage means, for receiving the tile size data and the second added value and outputting a third multiplied value; and third adder means, coupled to said first adder means and said third multiplier means, for receiving the first added value and the third multiplied value and outputting a display memory address.

11. A computer system for generating a display image, said computer system comprising:

a host processor for processing and generating display image data;

a display memory, coupled to said host processor, for storing the display image data; and a display controller, coupled to said host processor and said display memory, for receiving and storing display data in a display memory in a tiled address format, said display controller comprising:

tile shape determining means for determining optimal tile shape data from a predetermined range of tile shape data;

pixel location data input means, for receiving pixel data location data; and display memory address generating means, coupled to said pixel location data input means and said tile shape determining means, for processing tile shape data with the pixel location data to generate display memory address data, wherein said tile shape determining means comprises:

first register means for storing display mode data indicative of at least a display mode of said display controller;

look-up table means, coupled to said first register means, for receiving the display mode data and outputting tile shape data; and second register means, coupled to said look-up table means, for storing tile shape data.

12. The computer system of claim 11, wherein the tile shape data comprises tile size data, tile height data, and tile pitch data.

13. The computer system of claim 12, wherein the pixel location data comprises X and Y position data.

14. The computer system of claim 13, wherein said display memory address generating means comprises:

a first divider means, for receiving the tile size data and the tile height data and outputting tile width data;

a second divider means, coupled to said first divider means and said pixel location data input means, for receiving the X position data and the tile width data and outputting horizontal tile position and horizontal pixel position within a horizontally adjacent tile; and a third divider means, coupled to said first divider means and said pixel location data input means, for receiving the Y position data and the tile height data and outputting vertical tile position and vertical pixel position within a vertically adjacent tile.

15. The computer system of claim 14, further comprising:

first multiplier means, coupled to said first divider means and said third divider means, for receiving the tile width data and the vertical pixel position within a vertically adjacent tile and outputting a first multiplied value;

first adder means, coupled to said first multiplier means and said second divider means, for receiving the first multiplied value and the horizontal pixel position within a horizontally adjacent tile and outputting a first added value;

second multiplier means, coupled to said third divider means and said second register means, for receiving the vertical tile position and the tile pitch data and outputting a second multiplied value;

second adder means, coupled to said second divider means and the second multiplier means, for receiving the horizontal tile position and the second multiplied value and outputting a second added value;

third multiplier means, coupled to said second adder means and said second register means, for receiving the tile size data and the second added value and outputting a third multiplied value; and third adder means, coupled to said first adder means and said third multiplier means, for receiving the first added value and the third multiplied value and outputting a display memory address.

16. The computer system of claim 11, wherein said pixel location data input means comprises a bit block transfer engine for generating bit block transfers of pixel data.

17. A method for receiving and storing display data in a display memory in a tiled address format comprising the steps of:

storing tile shape data comprising tile size data, tile height data, and tile pitch data, receiving pixel data location data comprising X and Y position data, and processing tile shape data with the pixel location data to generate display memory address data, wherein said step of generating a display memory address comprises the steps of:

dividing the tile size data with the tile height data and outputting tile width data, dividing the X position data with the tile width data and outputting horizontal tile position and horizontal pixel position within a horizontally adjacent tile, and dividing the Y position data with the tile height data and outputting vertical tile position and vertical pixel position within a vertically adjacent tile.

18. The method of claim 17, wherein said step of generating a display memory address further comprising the steps of:

multiplying the tile width data with the vertical pixel position within a vertically adjacent tile and outputting a first multiplied value, adding the first multiplied value with the horizontal pixel position within a horizontally adjacent tile and outputting a first added value, multiplying the vertical tile position with the tile pitch data and outputting a second multiplied value, adding the horizontal tile position with the second multiplied value and outputting a second added value, multiplying the tile size data with the second added value and outputting a third multiplied value, and adding the first added value and the third multiplied value and outputting a display memory address.

19. A method for receiving and storing display data in a display memory in a tiled address format comprising the steps of:

determining optimal tile shape data from a predetermined range of tile shape data, receiving pixel data location data, and processing tile shape data with the pixel location data to generate display memory address data, wherein said step of determining optimal tile shape comprises the steps of:

storing display mode data in a first register, the display mode data indicative of at least a display mode of said display controller, receiving in a look-up table means the display mode data and outputting tile shape data, and storing tile shape data in a second register.

20. The method of claim 19, wherein the tile shape data comprises tile size data, tile height data, and tile pitch data.

21. The method of claim 20, wherein the pixel location data comprises X and Y position data.

22. The method of claim 21, wherein said step of generating a display memory address comprises the steps of:

dividing the tile size data with the tile height data and outputting tile width data, dividing the X position data with the tile width data and outputting horizontal tile position and horizontal pixel position within a horizontally adjacent tile, and dividing the Y position data with the tile height data and outputting vertical tile position and vertical pixel position within a vertically adjacent tile.

23. The method of claim 22, wherein said step of generating a display memory address further comprising the steps of:

multiplying the tile width data with the vertical pixel position within a vertically adjacent tile and outputting a first multiplied value, adding the first multiplied value with the horizontal pixel position within a horizontally adjacent tile and outputting a first added value, multiplying the vertical tile position with the tile pitch data and outputting a second multiplied value, adding the horizontal tile position with the second multiplied value and outputting a second added value, multiplying the tile size data with the second added value and outputting a third multiplied value, and adding the first added value and the third multiplied value and outputting a display memory address.

24. A display controller for receiving and storing display data in a display memory in a tiled address format, said display controller comprising:

pixel location data input means, for receiving pixel data location data, said pixel location data input means comprising:

bank interleave logic, for receiving at least a portion of the pixel data and selecting a bank of display memory from the selected portion of the pixel data, and a decoder, coupled to said bank interleave logic and said random access memory, for decoding at least a portion of the pixel location data into an address of the random access memory;

a random access memory, coupled to the pixel location data input means, for storing and supplying an address of at least one row of data within the display memory which is presently stored within a cache of the display memory; and comparator means, coupled to the pixel location data input means and the random access memory, for comparing at least a portion of the pixel location data with the address from said random access memory and outputting a row hit signal in response to such a comparison;

wherein said display controller generates a row access to the display memory if a row hit signal is not generated.

25. A display controller for receiving and storing display data in a display memory in a tiled address format, said display controller comprising:

pixel location data input means, for receiving pixel data location data;

a random access memory, coupled to the pixel location data input means, for storing and supplying an address of at least one row of data within the display memory which is presently stored within a cache of the display memory;

comparator means, coupled to the pixel location data input means and the random access memory, for comparing at least a portion of the pixel location data with the address from said random access memory and outputting a row hit signal in response to such a comparison;

tile shape determining means for determining optimal tile shape data from a predetermined range of tile shape data; and display memory address generating means, coupled to said pixel location data input means and said tile shape determining means, for processing tile shape data with the pixel location data to generate display memory address data, wherein said display controller generates a row access to the display memory if a row hit signal is not generated, and wherein said tile shape determining means comprises:

first register means for storing display mode data indicative of at least a display mode of said display controller;

look-up table means, coupled to said first register means, for receiving the display mode data and outputting tile shape data; and second register means, coupled to said look-up table means, for storing tile shape data.

26. The display controller of claim 25, wherein said pixel location data input means further comprises:

bank interleave logic, for receiving at least a portion of the pixel data and selecting a bank of display memory from the selected portion of the pixel data.

27. The display controller of claim 25, wherein said pixel location data input means further comprises:

a decoder, coupled to said bank interleave logic and said random access memory, for decoding at least a portion of the pixel location data into an address of the random access memory.

28. The display controller of claim 25, wherein the tile shape data comprises tile size data, tile height data, and tile pitch data.

29. The display controller of claim 28, wherein the pixel location data comprises X and Y position data.

30. The display controller of claim 29, wherein said display memory address generating means comprises:

a first divider means, for receiving the tile size data and the tile height data and outputting tile width data;

a second divider means, coupled to said first divider means and said pixel location data input means, for receiving the X position data and the tile width data and outputting horizontal tile position and horizontal pixel position within a horizontally adjacent tile; and a third divider means, coupled to said first divider means and said pixel location data input means, for receiving the Y position data and the tile height data and outputting vertical tile position and vertical pixel position within a vertically adjacent tile.

31. The display controller of claim 30, further comprising:

first multiplier means, coupled to said first divider means and said third divider means, for receiving the tile width data and the vertical pixel position within a vertically adjacent tile and outputting a first multiplied value;

first adder means, coupled to said first multiplier means and said second divider means, for receiving the first multiplied value and the horizontal pixel position within a horizontally adjacent tile and outputting a first added value;

second multiplier means, coupled to said third divider means and said second register means, for receiving the vertical tile position and the tile pitch data and outputting a second multiplied value;

second adder means, coupled to said second divider means and the second multiplier means, for receiving the horizontal tile position and the second multiplied value and outputting a second added value;

third multiplier means, coupled to said second adder means and said second register means, for receiving the tile size data and the second added value and outputting a third multiplied value; and third adder means, coupled to said first adder means and said third multiplier means, for receiving the first added value and the third multiplied value and outputting a display memory address.

32. The display controller of claim 25, wherein the pixel location data input means comprises a bit block transfer engine for generating bit block transfers of pixel data.

* * * * *